No. 735,581. PATENTED AUG. 4, 1903.
A. POLLACSEK & B. BEER.
THERAPEUTICAL APPARATUS.
APPLICATION FILED OCT. 20, 1902.
NO MODEL.
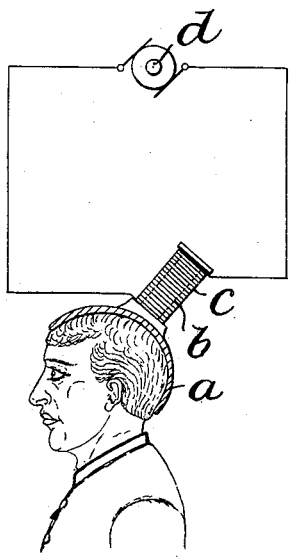
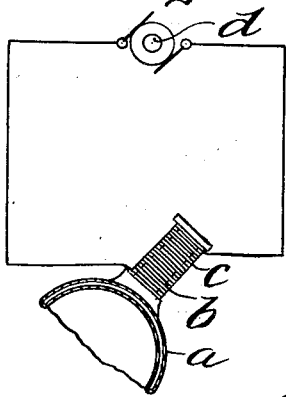
Witnesses:
N. L. Bogan
Inventors
Adrian Pollacsek
Berthold Beer
By James L. Norris
Atty No. 735,581. Patented August 4, 1903.

UNITED STATES PATENT OFFICE.

ADRIAN POLLACSEK AND BERTHOLD BEER, OF VIENNA, AUSTRIA-HUNGARY.

THERAPEUTICAL APPARATUS.

SPECIFICATION forming part of Letters Patent No. 735,581, dated August 4, 1903.

Application filed October 20, 1902. Serial No. 128,067. (No model.)

*To all whom it may concern:*

Be it known that we, ADRIAN POLLACSEK, a subject of the Emperor of Germany, and BERTHOLD BEER, a subject of the Emperor of Austria-Hungary, both residing at Vienna, Austria-Hungary, have invented certain new and useful Improvements in Therapeutical Apparatus, of which the following is a specification.

This invention relates to devices which are intended for therapeutical purposes and by means of which vibrations of diseased parts of the body can be produced. A device according thereto comprises a solid or a hollow body made of a magnetic metal or aluminium or aluminium alloys or a hollow body of nonmagnetic material, which is filled with a magnetic metal and is introduced into a magnetic field of alternating power. It is advantageous to form the solid or the hollow body so as to correspond to the part of the body to be treated. Such a body may consist of a plate, band, bar, pin, or tube. For treating external diseased parts of the body it is laid thereon, while for the treatment of the walls of cavities it is introduced into the said cavities. The device may, for example, be shaped as a cap to be placed on the head, and the cap may be introduced into a magnetic field produced by an electric current passing through the windings of an iron core. The said current induces currents in the metallic conducting-body, and these induction-currents produce the vibrations. The device can also be made in such a way that the metal body when brought into the magnetic field of alternating power does not come into direct contact with the diseased part of the body to be treated, but is connected by suitable rigid intermediate parts, as rods or tubes, with the plates, bands, bars, pins, or tubes, which have to be applied to or inserted into the diseased parts of the body. The vibrations are transmitted to the plates or the like by the rigid intermediate parts, which can be made of any suitable material.

In the accompanying drawings, Figure 1 represents an embodiment of the invention in the form of a cap adapted to be applied to the head, and Fig. 2 represents a modified construction wherein the cap is hollow.

*a* is the body, made of magnetic material or of aluminium, forming the cap. With this body *a* is connected the core *b* of a coil *c*, which is in connection with the source *d* of the electric current. The body *a* can be either made solid, as represented in the drawings, or it may be executed double-walled and form a hollow body.

We claim—

1. A therapeutical apparatus comprising a magnetic body adapted to be placed adjacent to the diseased portion of a patient, and means for transmitting vibrations to said magnetic body through an alternating current of electricity.

2. A therapeutical apparatus comprising a magnetic body adapted to be placed adjacent to the diseased portion of the patient, a magnetic core attached to said body, and means for inducing vibrations in said core and body through an alternating current of electricity.

3. A therapeutical apparatus comprising a magnetic body adapted to be placed adjacent to the diseased portion of the patient, a magnetic core attached to said body, an electric winding surrounding said core, and means for inducing alternating currents in said electric winding.

4. A therapeutical apparatus comprising a hollow magnetic body, a magnetic core connected thereto, an electric winding surrounding said magnetic core, and means for inducing alternating currents in said electric winding.

5. A therapeutical apparatus comprising a magnetic cap adapted to be applied to the head of the patient, a magnetic core attached to said cap, an electric winding surrounding said core, means for inducing alternating currents in said electric winding.

In testimony whereof we have hereunto set our hands in presence of two subscribing witnesses.

ADRIAN POLLACSEK.
BERTHOLD BEER.

Witnesses to the signature of Adrian Pollacsek:
CARL FREIERT,
PAUL ARRAS.

Witnesses to the signature of Berthold Beer:
JOSEF RUBRESCH,
ALVESTO S. HOGUE.